2,900,251
HIGH-TEMPERATURE BRAZING ALLOYS

Robert Melvin Evans and Harry Edward Pattee, Columbus, Ohio, assignors, by mesne assignments, to The Trane Company, La Crosse, Wis., a corporation of Wisconsin No Drawing. Application February 26, 1958
Serial No. 717,558

11 Claims. (Cl. 75—170)

This invention relates to brazing alloys which are to be used at high temperatures where oxidation resistance and strength are particularly important. More particularly, these new brazing alloys are useful for brazing such metallic materials as high-alloy steels, stainless steels, nickel-chromium alloys, etc.

When joining metallic materials of construction for use at high temperatures, especially if the metals being joined have very thin sections, considerable difficulty is encountered in producing suitable articles which are useful above 1000° F. Some brazing alloys, such as known nickel-base alloys, are unsuitable for such applications because some of the constituents of the alloy diffuse into the grain boundaries of the parent metals, thus causing embrittlement and early failure in the joint area. This condition is aggravated in those alloys having a wide melting range. Other brazing alloys such as known silver-base alloys, which do not react with the parent metal during brazing are not suitable for use above 1000° F. in ordinary hot-air atmospheres because the interface between the brazing filler-metal alloy and the parent metal rapidly oxidizes, thus rendering the joined article useless.

One object of this invention is to provide brazing filler-metal alloys which have oxidation resistance equal to, or better than, the metal being joined at temperatures above 1000° F. More importantly, the new brazing alloys accomplish the joining of the metal and permit use of the brazing metal without serious impairment of the physical properties of the base metal at, or near, the braze.

In the assembling of complex structures made from stainless steel, the inventors have found that alloys with compositions such as given in Table 1 produce well-bonded assemblies which have excellent oxidation resistance at temperatures at least up to 1400° F. In addition, if these alloys are properly used at temperatures slightly aove their melting ranges, very little attack of the stainless steel occurs in the form of intergranular embrittlement or excessive alloying. Such improvements are more noticeable in structures utilizing the thinner sections of metal, such as stainless steel of 0.005-inch thickness or thinner.

Table 1

| Alloy Number | Composition, weight percent | | | | Melting Range, °F. |
|---|---|---|---|---|---|
| | Nickel | Tin | Silicon | Palladium | |
| 20 | 58 | 27 | 5 | 10 | 1,910–1,980 |
| 24 | 30 | 45 | 5 | 20 | 1,830–1,860 |
| 19 | 51 | 24 | 5 | 20 | 1,840–1,880 |
| 21 | 45 | 30 | 5 | 20 | 1,900–1,990 |
| 31 | 49 | 24 | 7 | 20 | 1,850–1,890 |
| 14 | 45 | 20 | 5 | 30 | 1,970–2,160 |

These alloys may be made by any conventional method and preferably by a method which permits subsequent disintegration into the powder form in which they are used. A preferred method of making the powdered alloy involves melting of the essentially pure metal constituents in the following order: nickel and palladium first, followed by the addition of the other more easily oxidized lower melting constituents in a graphite or clay-graphite crucible. After melting in an induction furnace and stirring quickly, the molten alloy is poured into a high pressure water jet and the resultant disintegrated metal is caught in a tank along with the water. After drying and screening, the brazing alloy is ready for use. The particular mesh sizes of the disintegrated brazing alloy may be varied by suitable selection of the disintegration process and may be selected according to the particular application to which the brazing alloy is applied.

These new alloys may be applied to the area to be joined before actual brazing by any conventional means. Some of these methods are painting, spraying, dipping, or extrusion. In each of these methods, the powdered alloy is mixed with, or suspended in, a suitable carrier, such as an organic solvent, or a synthetic rubber, or other carriers well known in the art. The properties of the carriers must be such that they do not interfere with the brazing operation. Brazing of metal preferably should be done in a highly reducing atmosphere such as dry hydrogen, or in a vacuum, but the brazing of heavy sections of metal may be accomplished in a highly protective atmosphere, if desired.

A specific example of the results obtained when Alloy No. 24, Table 1, was used to join 0.003-inch A.I.S.I. type 347 Stainless Steel to 0.005-inch A.I.S.I. Type 347 Stainless Steel illustrates the utility and advantages of our invention. The alloy was mixed with a cement carrier comprising an acrylic ester resin solution, such as an "Acryloid" resin solution of Rohm & Haas Company, made for high-temperature brazing operations, to form a paste. The paste was then applied to the joint area and the assembly was brazed in dry hydrogen at 2030° F. for 5 minutes. Metallographic examination of a first part indicated no embrittling intergranular penetration of the stainless steel and very little interaction between the brazing alloy and the stainless steel. This improvement over known brazing alloys was noted even though the brazing temperature was about 125° F. above the preferred temperature for this alloy. A second part of the same sample was exposed to a moving air stream at 1300° F. for 400 hours and again examined metallographically. The brazed joint was intact showing oxidation resistance at least equal to the stainless steel parent metal.

Each of the alloys in Table 1 were utilized in a manner similar to the aforesaid Alloy No. 24 to braze metallic materials. Similar advantages and improvements were noted in the use of these other alloys embodied in Table 1.

In making these new brazing alloys, it is within the scope of the invention that the nickel content may be varied from 30 to 60 percent, the tin content from 20 to 45 percent, the palladium content from 10 to 30 percent, and the silicon content from 4 to 8 percent. It is also within the scope of the invention that the nickel content may be varied from 45 to 58 percent, the tin content from 20 to 30 percent, the palladium content from 10 to 30 percent, and the silicon content from 5 to 7 percent. It is further within the scope of the invention that the nickel content may be varied from 45 to 49 percent, the tin content from 20 to 30 percent, the silicon content from 5 to 7 percent, and the palladium content from 20 to 30 percent. Additionally, it is within the scope of the invention to vary the nickel content from 51 to 58 percent, the tin content from 24 to 27 percent, the palladium content 10 to 20 percent, and to maintain the silicon content at about 5 percent. Other conventional alloying elements may be present in the alloys in minor amounts, provided the major elements composing the brazing alloy are within the ranges given. The preferred compositions among those given in Table 1 are Alloys No. 19, No. 24, and No. 31.

What we claim:

1. An alloy for brazing for use at high temperatures consisting essentially of 30 to 60 percent nickel, 20 to 45 percent tin, 10 to 30 percent palladium, 4 to 8 percent silicon.

2. An alloy for brazing for use at high temperatures consisting essentially of 30 to 58 percent nickel, 20 to 45 percent tin, 10 to 30 percent palladium, 5 to 7 percent silicon.

3. An alloy for brazing for use at high temperatures consisting essentially of 45 to 58 percent nickel, 20 to 30 percent tin, 10 to 30 percent palladium, 5 to 7 percent silicon.

4. An alloy for brazing consisting essentially of about 30 percent nickel, about 45 percent tin, about 5 percent silicon, about 20 percent palladium.

5. An alloy for brazing consisting essentially of 45 to 49 percent nickel, 20 to 30 percent tin, 5 to 7 percent silicon, 20 to 30 percent palladium.

6. An alloy for brazing consisting essentially of 51 to 58 percent nickel, 24 to 27 percent tin, about 5 percent silicon, 10 to 20 percent palladium.

7. An alloy for brazing consisting essentially of about 58 percent nickel, about 27 percent tin, about 5 percent silicon, about 10 percent palladium.

8. An alloy for brazing consisting essentially of about 51 percent nickel, about 24 percent tin, about 5 percent silicon, about 20 percent palladium.

9. An alloy for brazing consisting essentially of about 45 percent nickel, about 30 percent tin, about 5 percent silicon, about 20 percent palladium.

10. An alloy for brazing consisting essentially of about 49 percent nickel, 24 percent tin, about 7 percent silicon, about 20 percent palladium.

11. An alloy for brazing consisting essentially of about 45 percent nickel, about 20 percent tin, about 5 percent silicon, about 30 percent palladium.

No references cited.